(12) United States Patent
Schline et al.

(10) Patent No.: US 12,278,512 B2
(45) Date of Patent: Apr. 15, 2025

(54) MULTI LOAD AND MULTI BATTERY SYSTEM WITH SHARING APPARATUSES

(71) Applicant: Intel Corporation, Santa Clara, CA (US)

(72) Inventors: Jeffrey Schline, Portland, OR (US); Samantha Rao, Bengaluru (IN); Naoki Matsumura, San Jose, CA (US); Ramon Cancel Olmo, Hillsboro, OR (US); Tod Schiff, Portland, OR (US); Arunthathi Chandrabose, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 964 days.

(21) Appl. No.: 17/132,771

(22) Filed: Dec. 23, 2020

(65) Prior Publication Data

US 2021/0135478 A1    May 6, 2021

(51) Int. Cl.
*H02J 7/00* (2006.01)
*G06F 1/3212* (2019.01)
*G06F 1/3287* (2019.01)

(52) U.S. Cl.
CPC ...... *H02J 7/007182* (2020.01); *G06F 1/3212* (2013.01); *G06F 1/3287* (2013.01); *H02J 7/0014* (2013.01); *H02J 7/0063* (2013.01)

(58) Field of Classification Search
CPC .... G06F 1/3212; G06F 1/3206; G06F 1/3203; G06F 1/32; G06F 1/3215; G06F 1/3218; G06F 1/3237; G06F 1/324; G06F 1/3293; G06F 1/3296
See application file for complete search history.

(56) References Cited

U.S. PATENT DOCUMENTS

| | | | |
|---|---|---|---|
| 11,715,960 B2 * | 8/2023 | Gao | H02J 7/007188 320/107 |
| 2014/0361549 A1 * | 12/2014 | Di Cristofaro | H02J 7/0048 290/40 R |
| 2017/0203850 A1 * | 7/2017 | Wang | H02J 7/34 |
| 2017/0212569 A1 * | 7/2017 | Valdez | H02J 9/06 |
| 2017/0264123 A1 * | 9/2017 | Mulawski | H02J 7/0014 |
| 2018/0024609 A1 * | 1/2018 | Bolt | H04L 67/104 713/323 |

(Continued)

*Primary Examiner* — Raymond N Phan
(74) *Attorney, Agent, or Firm* — NICHOLSON DE VOS WEBSTER & ELLIOTT LLP

(57) ABSTRACT

A workload dependent load-sharing mechanism in a multi-battery system. The mechanism is an energy management system that operates in three modes—energy saving mode, balancer mode, and turbo mode. The energy saving mode is a normal mode where the multiple batteries provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. A controller optimizes the sequence and charging rate for a hybrid battery to maximize both the charging current and charging speed of the battery, while enabling longer battery life. The hybrid battery comprises a fast charging battery and a high-energy density battery.

18 Claims, 12 Drawing Sheets

(56) References Cited

U.S. PATENT DOCUMENTS

| | | | |
|---|---|---|---|
| 2020/0295588 A1* | 9/2020 | Nibir | H02J 7/00711 |
| 2022/0029439 A1* | 1/2022 | Justin | H02J 7/0071 |
| 2022/0239129 A1* | 7/2022 | Winkler | B64D 27/24 |
| 2022/0314835 A1* | 10/2022 | Altaf | B60L 58/13 |

* cited by examiner

MULTI LOAD AND MULTI BATTERY SYSTEM WITH SHARING APPARATUSES

BACKGROUND

Data centers are one example of a use case where a high priority is placed on the reliable delivery of power among multiple servers, racks, clusters and/or other power sink devices. In such use cases, backup systems typically facilitate at least temporary delivery of battery power when a primary power supply is interrupted. As server farms and other such network resources continue to proliferate in number, size, and capability, there is expected to be an increasing demand for always-on operation of such resources. Always-on operation is possible when batteries have longer battery life. A next generation High-Energy (HE) density battery, such as a Li-ion battery with Li-metal anode, provides higher energy density thus longer battery life than today's equivalent sized Li-ion battery. However, to ensure good cycle life, charging speed of HE is preferred to be slower than today's Li-ion battery. For example, it may take 6.5 hours to fully charge a HE density battery, while today's Li-ion battery may take 1.5 hours to fully charge.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
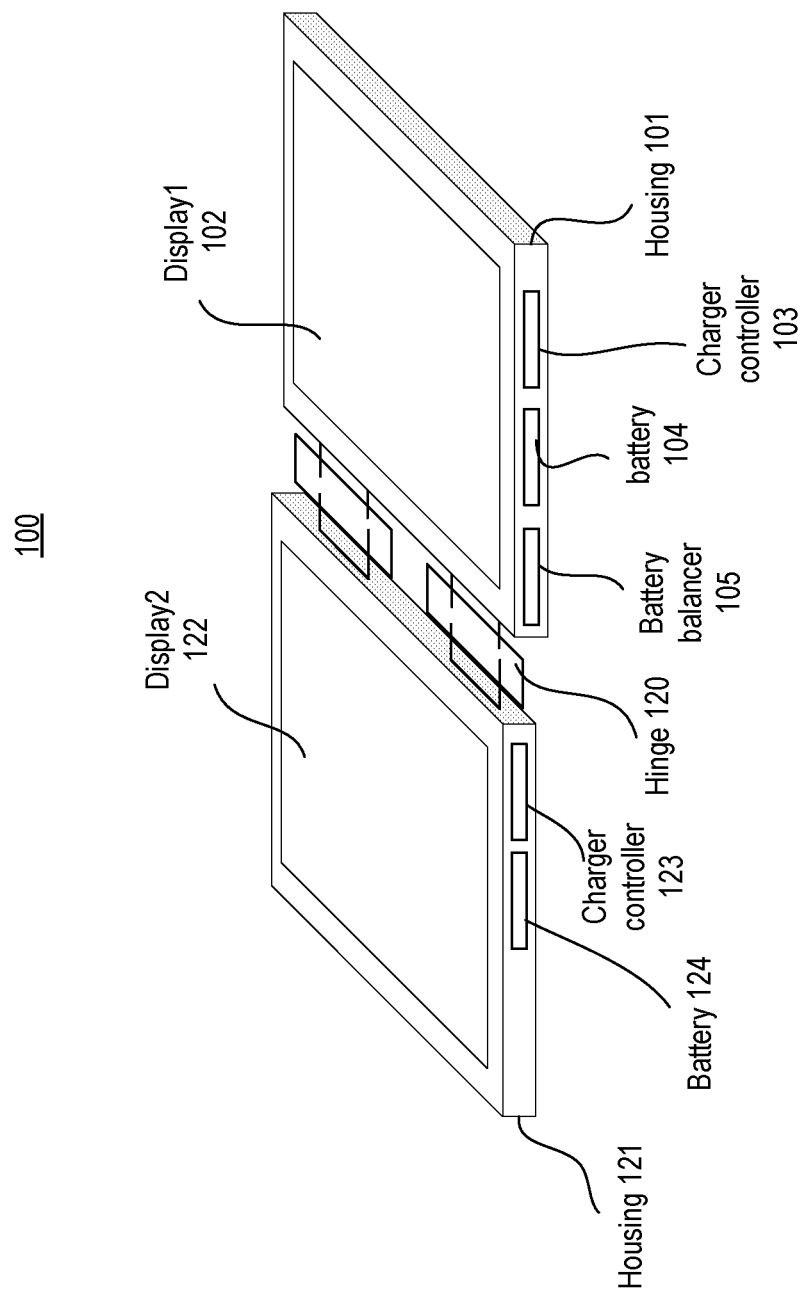
FIG. 1 illustrates an apparatus with dual display with two battery systems, one for each display, wherein the battery systems have workload dependent load-sharing mechanism, in accordance with some embodiments.

In multi-battery systems, it is preferred that all the batteries have the same number of charge-discharge cycles to equalize the ageing of the batteries. Another preference is that, during turbo power operation of a system-on-chip (SoC), batteries should provide their maximum power to prevent drop in the input power supply (Vin) to the SoC. During normal operation, resistive power dissipation is expected to be minimum to maximize battery life.

One way to provide same number of charge-discharge cycles for two batteries is to hook up the two batteries in parallel to supply to different load. For example, the two batteries are connected using parallel diodes. In one such example, active mode switches are used with each battery to create variable resistor droops to share currents in a proper proportion. However, when batteries supply to different loads, the batteries may be at different state-of-charge (SOC) leading to different ageing graphs. When batteries are connecting using parallel diodes, merely one battery can supply power at any given time. Thus, available battery capacity may not be used to support turbo operations for a processor of the system-on-chip. Further, using active mode switches to share currents inversely proportional to the state of charge leads to higher power loss and overall reduced battery life.

Some embodiments provide workload dependent load-sharing mechanism in a multi-battery system. The mechanism is an energy management system that operates in three modes. The three modes are energy saving mode, balancer mode, and turbo mode. The energy saving mode is a normal mode where the multiple batteries provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power. The embodiments herein are applicable to any computing device such as a server rack, desktop PC, laptop, smart device, etc.

There are many technical effects of the various embodiments. For example, workload dependent load-sharing mechanism reduces overall battery aging while supporting turbo modes of the state-of-charge. At the same time, the mechanism improves battery efficiency which in turn improves workload battery life in multi-battery systems such as a dual display device. Other technical effects will be evident from the various embodiments and figures.

Some embodiments describe a controller in a hybrid battery where Fast Charging (FC) battery and a High Energy density (HE) battery coexist in a system and are connected. In various embodiments, the controller optimizes the sequence of charging for the hybrid battery and controls charging speed adaptively. (e.g. charges a FC at high current first, followed by charging of HE at low current.). The controller can be implemented in software, hardware, or a combination of them. In some embodiments, the hybrid battery comprises a first battery capable of fast charging; a second battery with high energy density; and a controller coupled to the first and second batteries. In some embodiments, the controller controls a sequence of charging and/or discharging the first and second batteries to maximize a charging current and charging speed for the first and second batteries. In some embodiments, the controller charges the fast battery with constant current and thereafter with constant voltage. In some embodiments, the controller charges the second battery with constant current when the first battery is being charged with constant voltage.

In some embodiments, the controller charges the fast battery with constant current and thereafter with constant voltage, and wherein the controller charges the second battery with constant current when a current during constant voltage charging of the first battery is less than a constant current for the second battery. In some embodiments, the controller discharges the first battery first and then the second battery. In some embodiments, the controller discharges both the first battery first and the second battery when a load (e.g., processor) coupled to the first and second batteries is turbo mode. In some embodiments, when a load coupled to the first and second batteries uses power from both the first and second batteries, but a state of charge of the first battery is different than a state of charge of the second battery, then the controller discharges the first and second batteries such that voltages of the first and second batteries are substantially similar. In some embodiments, the controller is implemented in software, hardware, or a combination of software and hardware. In some embodiments, the controller applies context awareness and/or machine-learning to adapt to user habits and/or environmental situations to regulate charging of the first and second batteries.

The controller optimizes the sequence of charging and the charging rate for a hybrid battery so that charging current can be maximized Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates apparatus 100 with dual display with two battery systems, one for each display, wherein the battery systems have workload dependent load-sharing mechanism, in accordance with some embodiments. Apparatus 100 comprises first housing 101, second housing 121, and hinge linking first housing 101 and second housing 121. In some embodiments, first housing 101 comprises display 102, charger controller 103, battery 104 (or a group of batteries), and battery balancer 105. In some embodiments, second housing 121 comprises display 122, charger controller 123, and battery 124 (or a group of batteries). In various embodiments, a processor or system-on-chip (SoC) is powered by battery 104 and/or battery 124. In some embodiments, an embedded controller (EC) is part of housing 101 (or alternatively, housing 121) to control transistors or bi-directional voltage regulator to direct power to loads of housing 101 and/or housing 121. Here, the loads include components in the housing that are powered by the batteries. Examples of such loads include displays, processors, WLAN modules, modems, memory, etc.

In various embodiments, the embedded controller and/or balancer 105 implement workload dependent load-sharing mechanism. The mechanism is an energy management system that operates in three modes. As discussed herein, the three modes are energy saving mode, balancer mode, and turbo mode. The energy saving mode is a normal mode where the batteries 104 and 124 provide power to their own set of loads in their respective housings 101 and 121 with least resistive dissipation. In balancing mode, batteries 104 and 124 are connected through switches operating in active mode so that the current shared is inversely proportion to the corresponding battery state-of-charge. In turbo mode, both batteries 104 and 124 are connected in parallel through switches (e.g., on-switches) to provide maximum power.

While various embodiments here are described with reference to a dual display having multi-battery system, the embodiments are applicable to any multi-battery system having one or more loads. In some embodiments, batteries 104 and/or 124 are hybrid batteries comprising a fast charging battery and a high energy density battery as discussed with reference to FIGS. 8-11.

Figure 2:
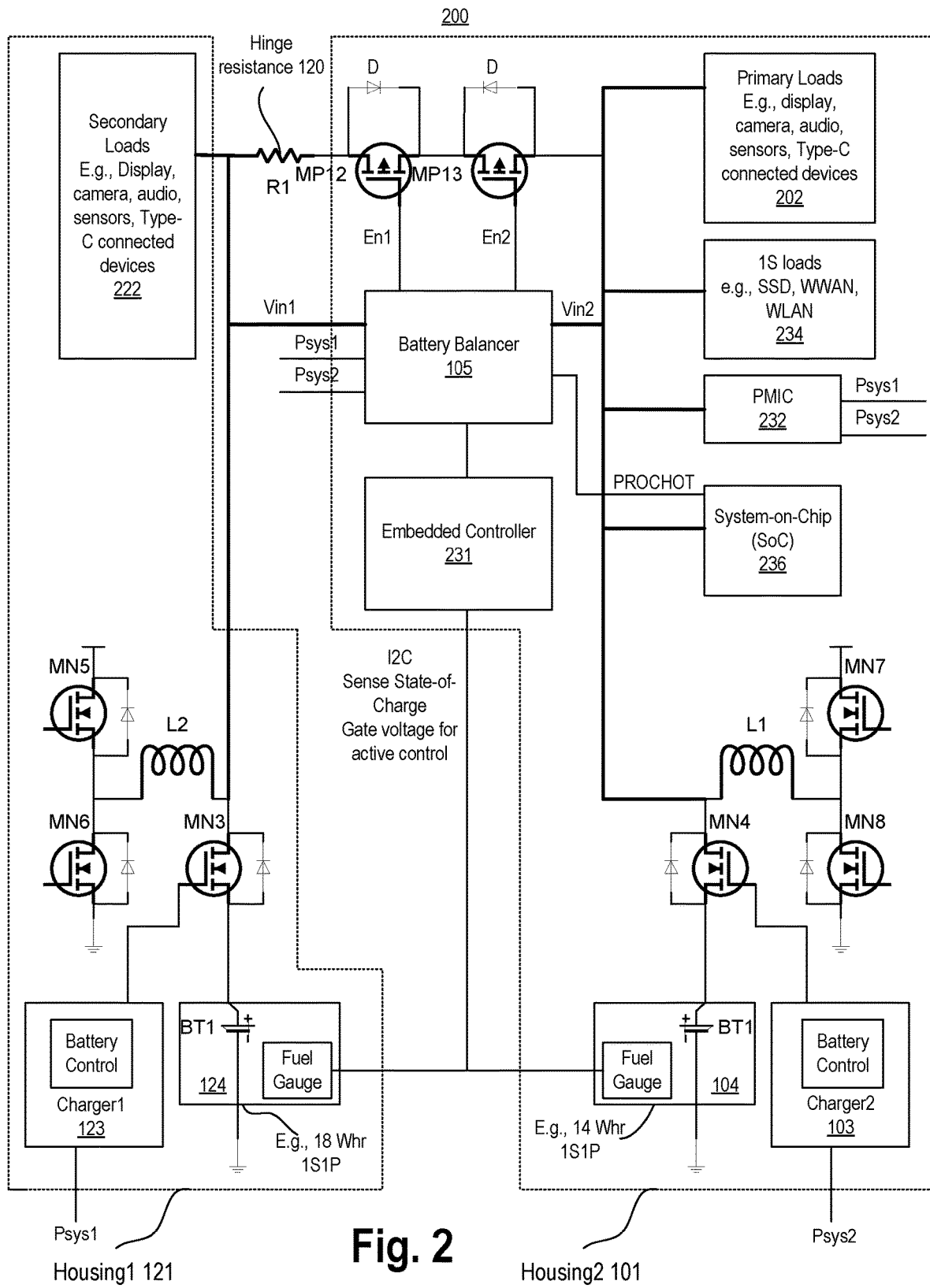
FIG. 2 illustrates a symmetric dual battery system with workload dependent load-sharing mechanism, in accordance with some embodiments.

FIG. 2 illustrates a symmetric dual battery system 200 with workload dependent load-sharing mechanism, in accordance with some embodiments. In some embodiments, housing 101 of system 200 comprises primary loads 202 (e.g., display 102, camera, audio sensors, universal serial bus (USB) Type-C connectors (and controllers), loads 234 (e.g., solid state drive (SSD) wireless wide area network (WWAN), wireless local area network (WLAN)) for 1S battery, power management integrated circuit 232 (PMIC), embedded controller 231, system-on-chip 236 (e.g., processor), battery 104 with fuel gauge, charger 103, n-type transistors MN3, MN7, and MN8, p-type transistors MP12 and MP13, and inductor L1.

In some embodiments, housing 121 of system 200 comprises secondary loads 222, battery 124 with fuel gauge, charger 123, n-type transistors MN3, MN5, and MN6, and inductor L2. In some embodiments, secondary loads 222 includes modules such as display 122, camera, speakers etc. whereas primary side (e.g., housing 101) include the motherboard apart from display 102. In various embodiments, the power consumption of primary side is higher at any given time compared to the secondary side (e.g., housing 121). As discussed with reference to FIG. 1, housing 101 is connected to housing 121 via hinges 120. Hinge 120 provides significant resistance on the path from one housing 101 to housing 121 due to, for example, limited copper area of cross-section that can pass through hinge 120. The resistance can range from 30 mOhms to a 100 mOhms depending on the construction of hinge 120. If no active MOSFET control is enabled, due to the hinge resistance, majority of the load will be taken by primary battery 104.

In some embodiments, transistors MP12 and MP13 are controlled using battery pack balancer 105 via enable controls En1 and En2, respectively. Transistors MP12 and MP13 are controlled to enable balancer mode, turbo mode, and one-battery made. These pair of transistors can be replaced with a bidirectional 1S to 2S switch capacitor voltage regulator (SCVR) converter to support asymmetric battery pairs as discussed with reference to FIG. 3. Batteries 104 and/or 124 can be, for example, 1S (one cell in series) or 2S (two cells in series). However, the scheme of various embodiments can be implemented theoretically for any combination of battery cells.

Referring back to FIG. 2, in some embodiments, embedded controller 231 reads the state-of-charge of each of the batteries 104 and 124 and the discharge current from each of them. This allows embedded controller 231 to decide what the current sharing should be. This information is sent back to the chargers 103 and 123 to control the battery transistors MN3 and/or MN3). Here, transistors MN5-MN7 are charger transistors. These transistors switch during charging as per the charger control from chargers 103 and 123. But otherwise transistors MN5-MN7 are turned off.

In some embodiments, battery chargers 103 and 123 generates controls, in response from control from embedded controller 231, for the transistors to enable full on and active modes of battery transistors MN3 and MN4.

In some embodiments, during energy saving mode (also referred to as the normal operation mode), balancer 105 asserts enable signals En1 and En2 to turn off transistors MP12 and MP13. In this mode, each battery 104 and 124 provides power to its own set of loads. For example, battery 104 provides power to power supply rail Vin2 for loads 202, 234, PMIC 232, and system-on-chip 236. Likewise, battery 124 provides power to power supply rail Vin1 for loads 222. In this case, there is no power loss (or substantially zero power loss) through the hinge resistance or active switches MP12 and MP13. To provide power to supply rails Vin1 and Vin2, transistors or switches MN3 and MN4 are completely turned on by chargers 103 and 123, respectively. Here, node names and signal names are interchangeably used. For example, Vin1 may refer to voltage Vin1 or power supply rail Vin depending on the context of the sentence.

In some embodiments, during balancer mode, balancer 105 turns on switches MP12 and MP13. For example, balancer 105 de-asserts En1 and En2. In this mode, both batteries 104 and 124 are combined to provide power to all the loads. The impedances of transistor MP3 and MP4 are set according to the respective state of charges of the batteries and the currents from them. In some embodiments, balancer mode is a slow closed loop operation, which stabilizes at the current drawn from each battery as being inversely proportional to their state of charge. In some embodiments, balancer mode is initiated whenever the two batteries 104 and 124 differ significantly in their state of charge and need balancing. In some embodiments, balancing mode can start when machine-learning based Dynamic Tuning Technology (DTT) ML-DTT, which predicts the workload behavior, points to a low power workload on system-on-chip 236.

In some embodiments, in turbo mode, balancer 105 turns on transistors MP12 and MP12. For example, balancer 105 de-asserts En1 and En2. On accord of high currents being drawn from both batteries 104 and 124, the battery transistors MN3 and MN4 saturate and turn on via their respective chargers 103 and 123. Thus, they both are at maximum power discharge mode and are combined to provide turbo power to system-on-chip 236. In some embodiments, turbo mode is used to support power limit PL4 power. Other examples of power limits are power limit 1 (PL1), power limit 2 (PL2), power limit 3 (PL3), and Tau. Package power control settings of PL1, PL2, PL3, PL4 and Tau allow a designer to configure Intel® Turbo Boost Technology 2.0 to match the platform power delivery and package thermal solution limitations. PL1 is a threshold for average power that will not exceed. PL1 is generally set to equal Thermal Design Power (TDP). PL1 is usually not set higher than thermal solution cooling limits. PL2 is a threshold that if exceeded, the PL2 rapid power limiting algorithms will attempt to limit the spike above PL2. PL3 is a threshold that if exceeded, the PL3 rapid power limiting algorithms will attempt to limit the duty cycle of spikes above PL3 by reactively limiting frequency. PL4 is a limit that will not be exceeded, the PL4 power limiting algorithms will preemptively limit frequency to prevent spikes above PL4. Turbo Time Parameter (Tau) is an averaging constant used for PL1 exponential weighted moving average (EWMA) power calculation.

In some embodiments, when the input power Vin2 on in primary housing 101 falls below a threshold implying higher current, the switches MP12 and MP13 are enabled, which allows both batteries to contribute to the turbo load. Additionally, this mode is provided with means to assert PROCHOT. PROCHOT stands for Processor Hot and is a trigger temperature at which system-on-chip 236 starts to throttle. This is done by sensing the PSYS pins from both batteries 104 and 124 and when that exceeds a limit, PROCHOT is asserted.

In some embodiments, in One-Battery mode there is an additional possibility of allowing one battery to provide power to both the set of loads in housing 101 and 121. This is an intermediate mode, where an overcharged battery can be allowed to discharge more. This mode can be reached by using En1 or En2 signals to control MP12 and MP13, respectively based on the state-of-charge of each battery.

In some embodiments, in charge mode, balancer 105 turns off transistors MP12 and MP13 during charging of batteries 104 and 124 to ensure unintended current loops are not formed in the battery system.

Figure 3:
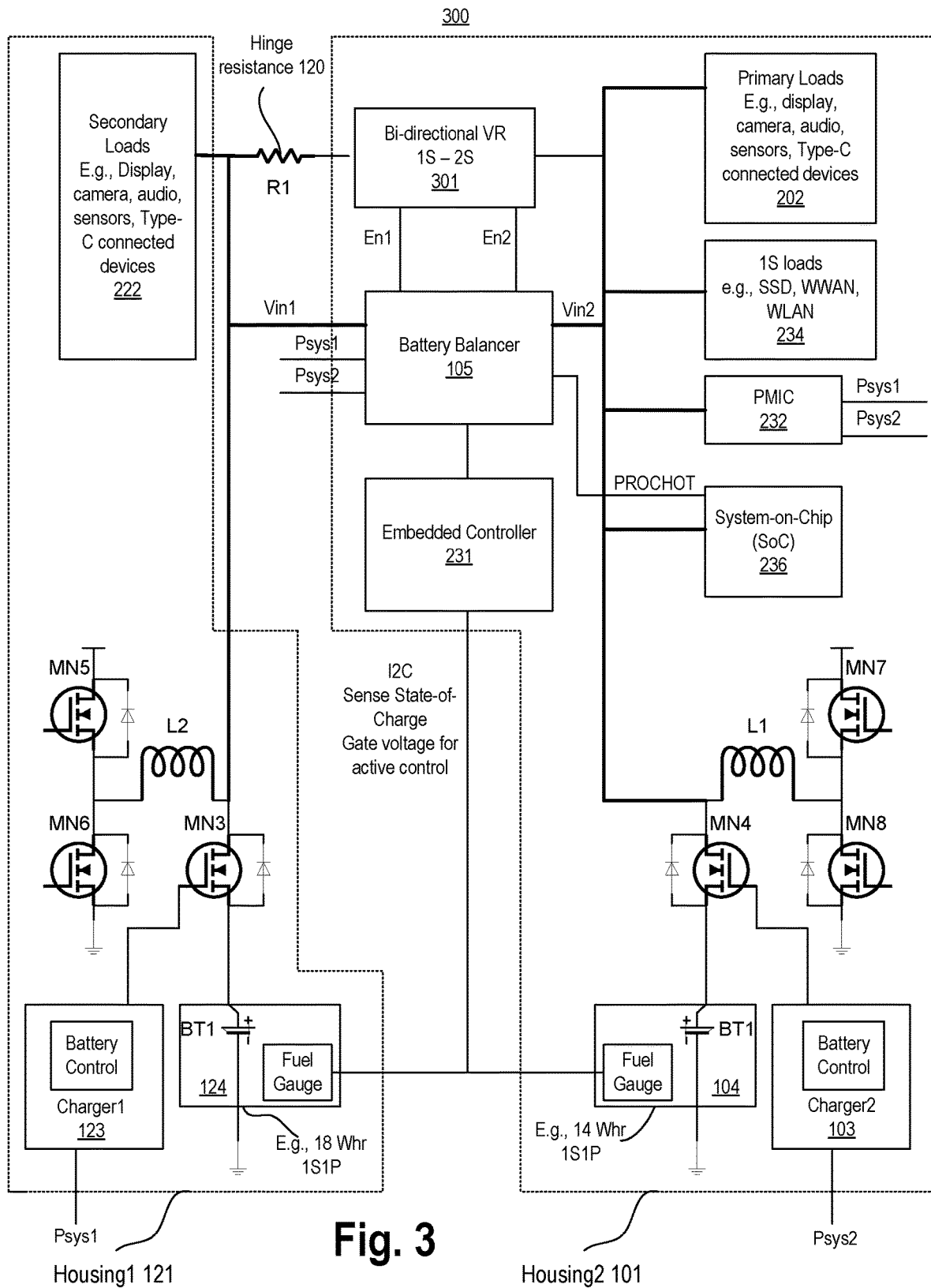
FIG. 3 illustrates an asymmetric dual battery system comprising bi-directional voltage regulator and with workload dependent load-sharing mechanism, in accordance with some embodiments.

FIG. 3 illustrates an asymmetric dual battery system 300 comprising bi-directional voltage regulator and with workload dependent load-sharing mechanism, in accordance with some embodiments. System 300 is similar to system 200 but for replacing transistors MP12 and MP13 with bi-directional voltage regulator (VR) 301. In some embodiments, bi-directional VR 301 is a switch-capacitor based VR. In various embodiments, bi-directional VR 301 is operable to generate regulated output supply for either housing 101 or housing 121 according to logic level of En1 and/or En2.

In some embodiments, during energy saving mode (also referred to as the normal operation mode), balancer 105 asserts En1 and En2 to turn off bi-directional VR 301. In this mode, each battery 104 and 124 provides power to its own set of loads. For example, battery 104 provides power to power supply rail Vin2 for loads 202, 234, PMIC 232, and system-on-chip 236. Likewise, battery 124 provides power to power supply rail Vin1 for loads 222. In this case, there is no power loss (or substantially zero power loss) through the hinge resistance or bi-directional VR 301. To provide power to supply rails Vin1 and Vin2, transistors or switches MN3 and MN4 are completely turned on by chargers 103 and 123, respectively.

In some embodiments, during balancer mode, balancer 105 turns on bi-directional VR 301. For example, balancer 105 asserts En1 and En2. En1 and En2 together determine the direction of current and ON/OFF status of the bidirectional voltage regulator. In this mode, both batteries 104 and 124 are combined to provide power to all the loads. The impedances of transistor MP3 and MP4 are set according to the respective state of charges of the batteries and the currents from them. In some embodiments, balancer mode is a slow closed loop operation, which stabilizes at the current drawn from each battery as being inversely proportional to their state of charge. In some embodiments, balancer mode is initiated whenever the two batteries 104 and 124 differ significantly in their state of charge and need balancing. In some embodiments, balancing mode can start when machine-learning based Dynamic Tuning Technology (DTT) ML-DTT, which predicts the workload behavior, points to a low power workload on system-on-chip 236.

In some embodiments, in turbo mode, balancer 105 turns on bi-directional VR 301. For example, balancer 105 de-asserts En1 and En2. On accord of high currents being drawn from both batteries 104 and 124, the battery transistors MN3 and MN4 saturate and turn on via their respective charges 103 and 123. Thus, they both are at maximum power discharge mode and are combined to provide turbo power to system-on-chip 236. In some embodiments, turbo mode is used to support power limit PL4 power. In turbo mode, system-on-chip 236 demands burst power. As such, bi-directional VR uses Vin1 as input supply and provides regulated supply Vin2 to service the load demand in turbo mode. EN1 and EN2 determine the direction and ON/OFF Status.

In some embodiments, when the input power Vin2 in primary housing 101 falls below a threshold implying higher current, bi-directional VR 301 is enabled, which allows both batteries to contribute to the turbo load. Additionally, this mode is provided with means to assert PROCHOT to throttle system-on-chip 236. This is done by sensing the PSYS pins from both batteries 104 and 124 and when that exceeds a limit, PROCHOT is asserted.

In some embodiments, in One-Battery mode there is an additional possibility of allowing one battery to provide power to both the set of loads in housing 101 and 121. This is an intermediate mode, where an overcharged battery can be allowed to discharge more. This mode can be reached by using En1 or En2 signals to control bi-directional VR 301 based on the state-of-charge of each battery.

In some embodiments, in charge mode, balancer 105 turns off bi-directional VR 301 during charging of batteries 104 and 124 to ensure unintended current loops are not formed in the battery system.

Figure 4:
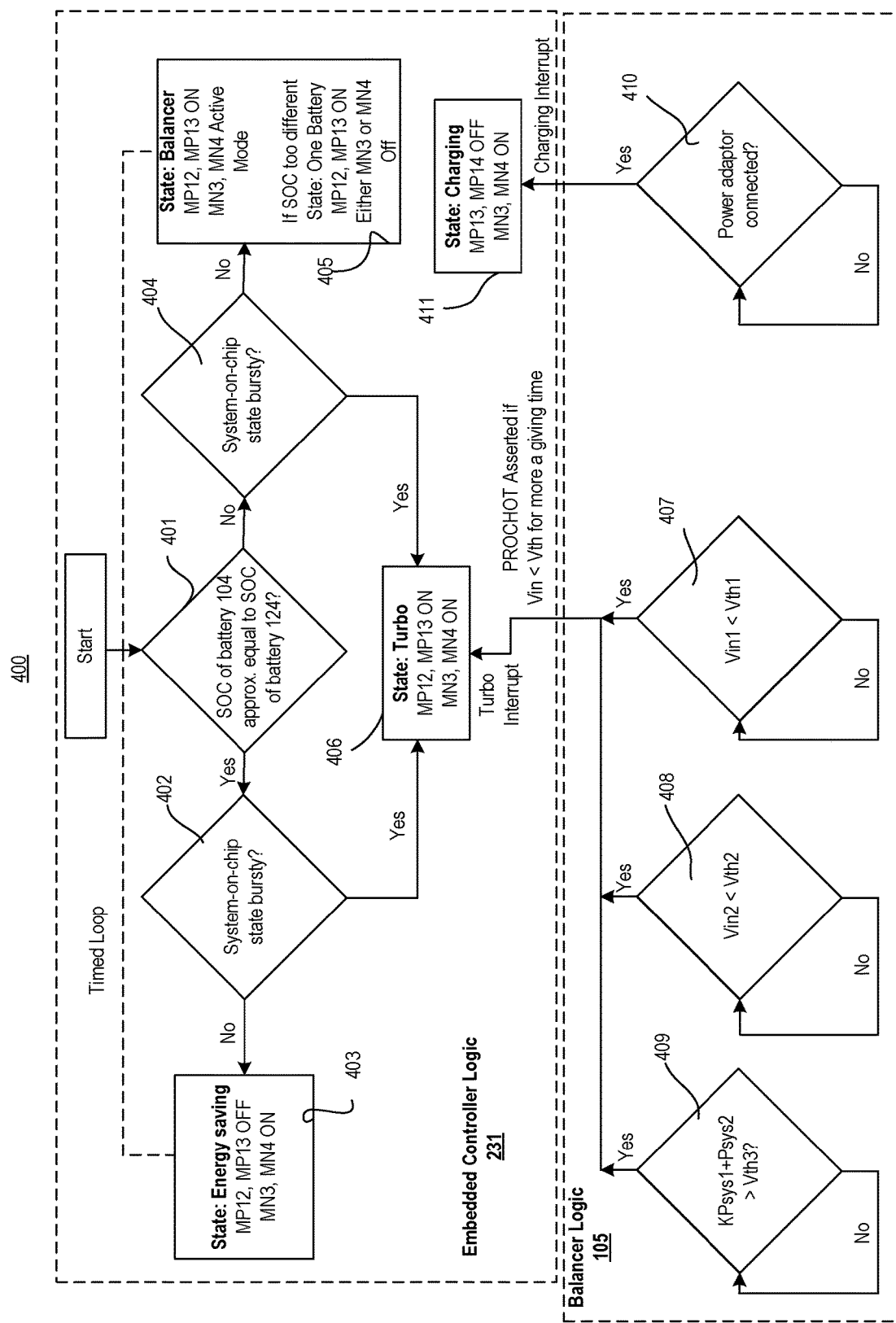
FIG. 4 illustrates a flowchart of a method performed by an embedded controller coupled to a battery pack balancer for workload dependent load-sharing, in accordance with some embodiments.

FIG. 4 illustrates flowchart 400 of a method performed by an embedded controller and the battery pack balancer for workload dependent load-sharing, in accordance with some embodiments. While the blocks of flowchart 400 are illustrated in a particular order, the order can be modified. For example, some blocks may be performed before others while some blocks may be performed in parallel. Flowchart 400 illustrates process performed by embedded controller 231 and balancer 105. In some embodiments, some or all processes of flowchart 400 are performed in software. In some embodiments, some or all processes of flowchart 400 are performed in hardware. In some embodiments, some or all processes of flowchart 400 are performed in a combination of software and hardware. In some embodiments, the processes of flowchart 400 can be performed in one logic. For example, embedded controller 231 may perform the functions of itself and balancer 105. In another example, balancer 105 may perform the functions of itself and embedded controller 231.

At block 401, a comparator compares the state of charge (SOC) of battery 104 with the SOC of battery 124. If the SOC of battery 104 is approximately equal to the SOC of battery 124, the process proceeds to block 402. At block 402, a determination is made regarding the state of system-on-chip 236 (or processor 236). If system-on-chip 236 (or processor 236) is bursty (e.g., experiences sudden peak power demand such as in turbo mode or any other high-performance mode), the process proceeds to block 406. Otherwise the process proceeds to block 403. At block 403, system 200 (or 300) enters the energy saving mode. As discussed herein, in energy saving mode, balancer 105 turns off transistors MP12 and MP13 (or bi-directional VR 301) while chargers 103 and 123 turn on transistors MN3 and MN4. The process then proceeds to block 401. This loop happens continuously in the system to ensure that all modes happen appropriately. In some embodiments, this loop can be slow. For example, the loop completes every few seconds. However, entry to turbo mode needs to be fast/instantaneous and hence analog comparison circuit is utilized for this.

At block 406 (when its determined that system-on-chip 236 (or processor 236) is bursty), balancer 105 enters the system in turbo mode where it turns on transistors MP12 and MP12 (or enables bi-directional VR 301) while chargers 103 and 123 turn on transistors MN3 and MN4. The process then proceeds to block 401 where the SOC of the batteries 104 and 124 are checked followed by determination about whether system-on-chip 236 (or processor 236) is bursty. If the SOC of battery 104 is not approximately equal to the SOC of battery 124, the process proceeds to block 402, otherwise the process proceeds to block 404. At block 402, a determination is made regarding the state of system-on-chip 236 (or processor 236). If system-on-chip 236 (or processor 236) is bursty (e.g., experiences sudden peak power demand), the process proceeds to block 406. Otherwise the process proceeds to block 405.

At block 405, balancer 105 enters the system in balancer mode where it turns on transistors MP12 and MP13 (or bi-directional VR 301). In this mode, chargers 103 and 103 place transistors MN3 and MN4 in active modes, respectively. In active modes, the impedances of transistors MN3 and MN4 are set according to the respective state of charges and currents from them. This is a slow closed loop operation which stabilizes at the current drawn from each battery as being inversely proportional to their state of charge. In some embodiments, if the SOCs of the two batteries 104 and 124 is too different (e.g., more than 20% or any predetermined or programmable threahold) then balancer 105 enters the One Battery mode. In the One Battery mode, balancer 105 turns off MP12 and MP13 (or bi-directional VR 301) while chargers 103 and 103 turn on MN3 and MN4.

In some embodiments, balancer 105 comprises comparators to compare the voltage on the input supply rails Vin1 and Vin2 with battery threshold voltages Vth1 and Vth2. At block 407, a first comparator compares voltage on Vin1 with Vth1. If Vin1 is less than Vth1, a turbo interrupt is issued and the system enters turbo state as indicated by block 405. Otherwise, the first comparator continues to compare voltage on Vin1 with Vth1. At block 408, a second comparator compares voltage on Vin2 with Vth2. If the voltage on Vin2 is less than Vth2, a turbo interrupt is issued and the system enters turbo state as indicated by block 405. Otherwise, the second comparator continues to compare voltage on Vin2 with Vth2. At block 409, a third comparator compares a sum of KPsys1 and KPSys2 with threshold Vth3.

Psys1 and Psys2 are analog outputs from the charger which are proportional to the total power being drawn from the battery. Here, K is a constant that provides a voltage proportional to the powers. Psys1 and Psys2 are also sensed and compared against specific thresholds to monitor whether any of the batteries are providing more power than expected or safe. Additionally, or alternatively, Psys1 and Psys2 can be used to determine whether balancer 105 needs to change the mode when one battery is providing very high proportion (e.g., more than 60%) of the total power. The different thresholds are set based on system conditions. For example, Vth3 is set based on the maximum power that the system can be allowed to draw, based on the platform ingredients and the processor. In one example, Vth2 and Vth3 are set as the minimum value of voltage that allows all the parts on the battery rail to function. These thresholds can be set based on the component with the maximum value of Vmin (the voltage below which the component will not function).

In some embodiments, when a power adaptor is connected, at block 410, balancer 105 issues charging interrupt to embedded controller. Upon receiving the charging interrupt, embedded controller 231 puts the system in charging mode as indicated by block 411. In charging mode, balancer 104 turns off MP13 and MN14 (or bi-directional VR) while chargers 103 and 123 turn on devices MN3 and MN4. In charging mode, batteries 104 and 124 are charged by the power adapter and MP13 and MN14 are turned off to ensure unintended current loops are not formed in the battery system. In some embodiments, when the batteries 104 and/or 124 are hybrid batteries, the charging and/or discharging is optimized to extend battery life as discussed with reference to FIG. 8.

Figure 5:
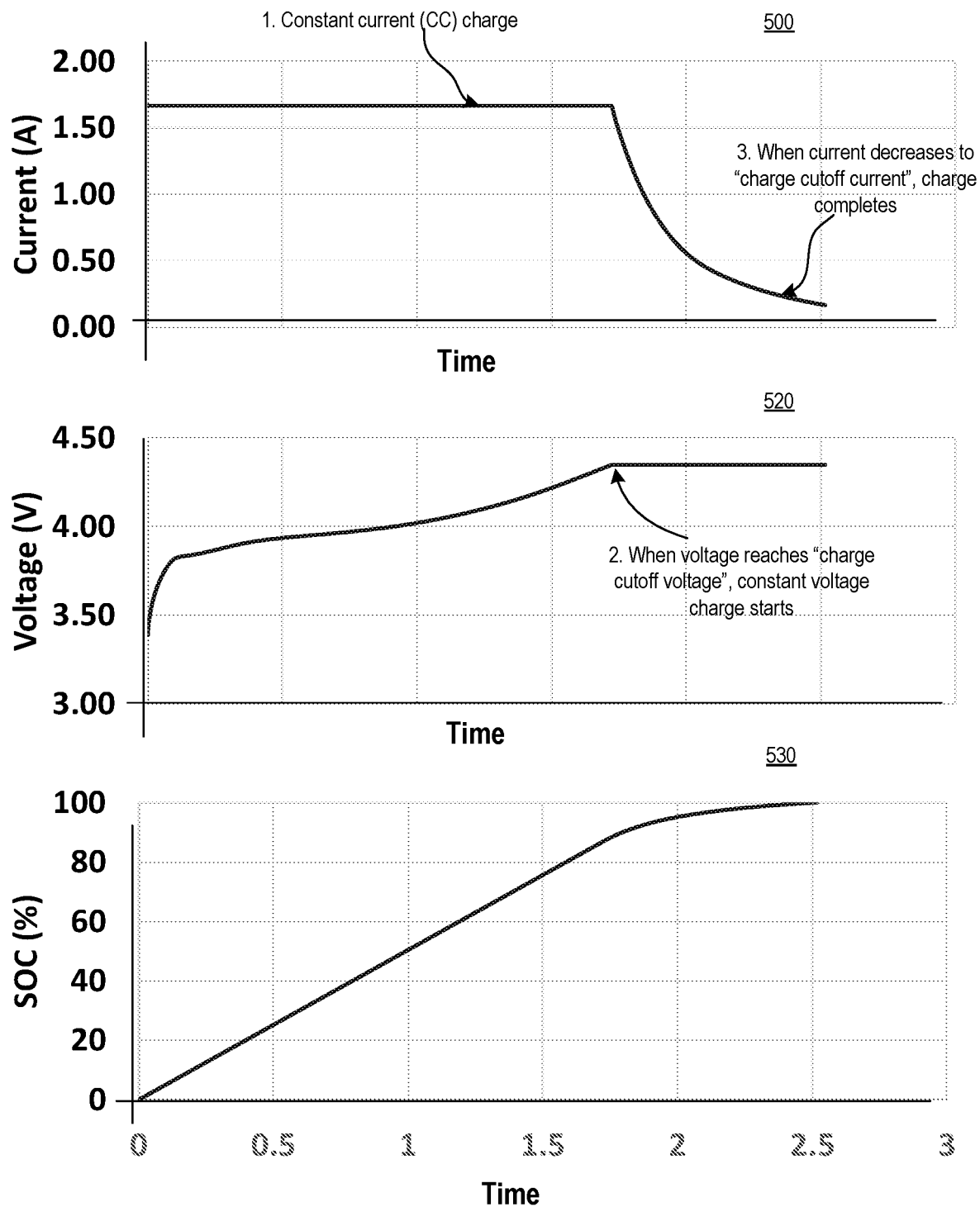
FIG. 5 illustrates a set of plots showing battery charging mechanism that uses constant current followed by constant voltage to charge a battery.

FIG. 5 illustrates a set of plots 500, 520, and 530 showing battery charging mechanism that uses constant current followed by constant voltage to charge a battery. Plot 500 illustrates a current plot where the battery is initially charged using constant current charge (e.g., usually at 0.5 C to 1.0 C depending upon the specification of the battery cell). Plot 520 shows a voltage plot where the battery begins to charge using constant voltage (e.g., 4.2V to 4.4V depending on the specification of the battery cell) when the battery voltage reaches a charge cutoff voltage. At that point, constant current charging is stopped. As shown in plot 500, when current decreases to charge current cutoff (e.g., 0.02 to 0.05 C depending on the specification of the battery cell), charge completes. Plot 530 illustrates the state of charge (SOC) for a 3.3 Ah Li-ion battery as it charges using constant current followed by constant voltage upon charge cutoff voltage, and then stopping the charge upon reaching cut-off current. Numbers in x axis and y axis in FIG. 5 are examples and may change by battery spec, size or other factors.

Figure 6:
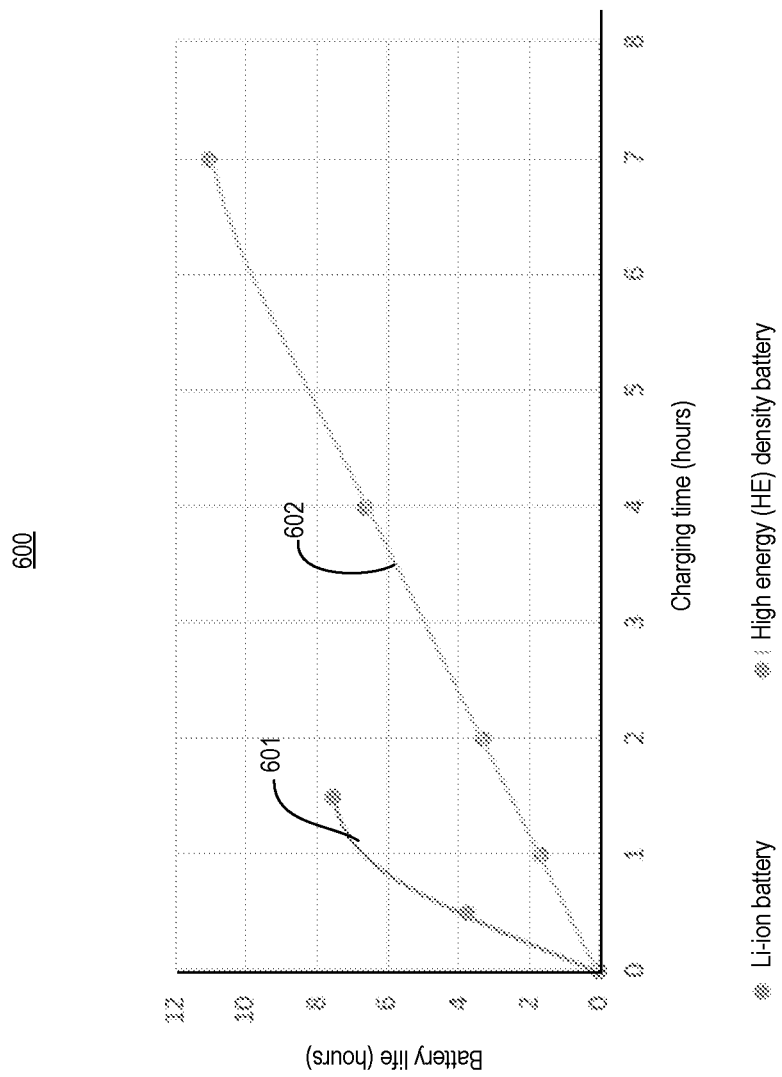
FIG. 6 illustrates a plot showing charging time vs. battery life for a fast charging (FC) battery and high energy (HE) battery.

FIG. 6 illustrates plot 600 showing charging time vs. battery life for a fast charging (FC) battery (waveform 601) and high energy (HE) battery (waveform 602). Here, x-axis is Charging time (e.g., in hours) and the y-axis is battery life (e.g., hours). While HE battery provides longer battery life with a full charge, the slow charging speed of HE can be undesirable to end-users. One option is to consider a hybrid battery where HE is connected with a Fast Charging (FC) battery in parallel. However, it may not be a practical solution because charging speed is constrained by charging speed of the HE battery.

Figure 7:
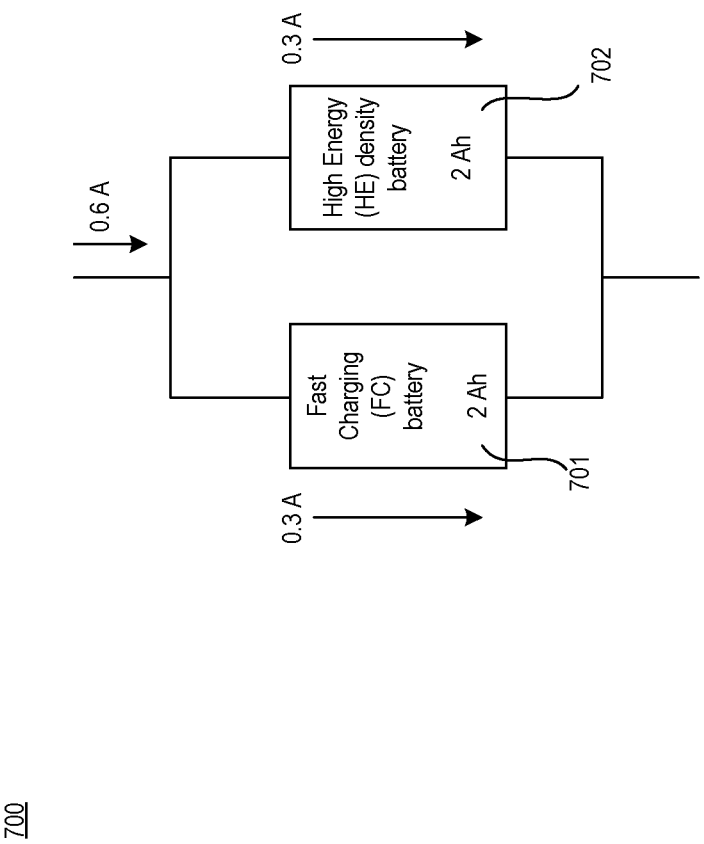
FIG. 7 illustrates a hybrid battery system where FC battery is coupled in parallel to an HE battery.

FIG. 7 illustrates hybrid battery system 700 where a FC battery is coupled in parallel to an HE battery. Table 1 illustrates an example of specifications of a fast charging battery and high energy density battery.

TABLE 1

|  | Fast Charging (FC) battery | High Energy density (HE) battery |
|---|---|---|
| Energy density | 700 Wh/l | 1000 Wh/l |
| Capacity | 2 Ah | 2 Ah |
| Maximum charge rate | 1 C (=2 A) | 0.15 C (=0.3 A) |
| Maximum discharging rate | 1 C | 1 C |
| Impedance | Baseline | Same |

For the same charge capacities, a battery pack having FC battery and a HE battery can benefit from fast charging of the FC battery. Note, that today's typical Li-ion battery, which is capable of normal charging rate (1 C), may not be categorized as a FC battery in the market but is categorized as a FC battery in this disclosure. This is because the charging rate of typical Li-ion batteries is faster than a charging rate of a HE battery. Any battery that is capable of a faster charging rate than a charging rate of a HE battery is categorized as a FC battery in this disclosure. For conveniences sake, battery capacity and impedance are the same in this example. Battery cells with different capacity and/or impedance cells can be used.

Hybrid battery system 700 comprises FC battery 701 coupled in parallel with HE battery 702. When FC battery 701 and HE battery 702 of Table 1 are connected in parallel and make a hybrid battery system 700, total energy density is approximately 857 Wh/l which is 14% greater than having only FC battery 701. However, charging speed is constrained by the maximum charge rate specification of HE battery 702. As a result, FC battery 701 can be charged at 0.3 A (Amperes) although it is capable of charging at 2 A. In total, merely 0.6 A can be supplied for battery charging, which does not address the slow charging problem.

Figure 8:
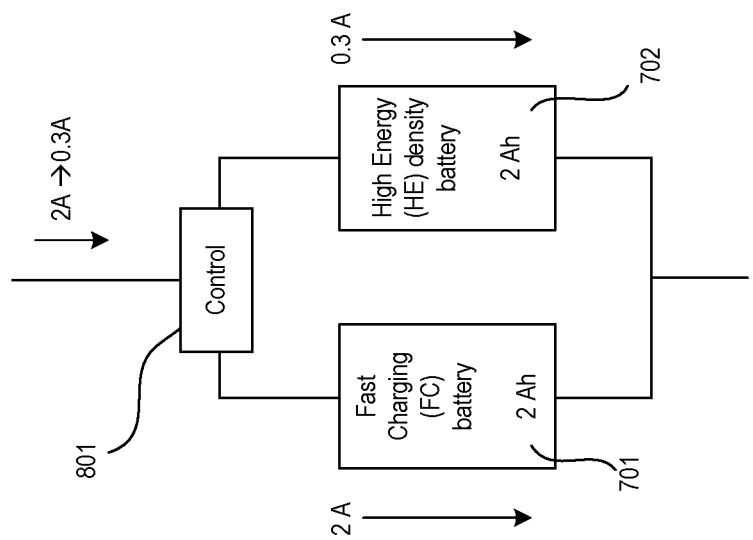
FIG. 8 illustrates a hybrid battery system where FC battery is coupled in parallel to an HE battery, where the two batteries are controlled by a controller to optimize charging and/or discharging behavior of the batteries, in accordance with some embodiments.

FIG. 8 illustrates hybrid battery system 800 where FC battery is coupled in parallel to an HE battery, where the two batteries are controlled by a controller to optimize charging and/or discharging behavior of the batteries, in accordance with some embodiments. Here, hybrid battery means that at least two kinds of cells reside in a single battery pack. However, some embodiments apply to the case where at least two kinds of batteries are placed separately and connected.

Compared to system 700, here controller 801 is introduced which controls the charging and/or discharging behavior of FC battery 701 and HE battery 702. Controller 801 can be implemented in hardware, software, or a combination of them. In some embodiments, controller 801 charges FC battery 701 first at maximum charge rate allowable for FC battery 701, followed by charging of HE battery 702 at a maximum charge rate of allowable for HE battery 702. For example, with reference to the battery specifications in Table 1, when batteries 701 and 702 are empty, controller 801 starts with 2 A charging for FC battery 701, followed by 0.3 A charging for HE battery 702. In some embodiments, battery 104 and/or battery 124 are a hybrid batter like system 800.

In some examples, the total charging time of the hybrid battery system 800 using controller 801 may take longer than the charging time for system 700 without controller 801. However, controller 801 starts with higher charging current (2 A) than the existing hybrid battery (0.6 A), from empty towards 50% charge, controller 801 allows up to 3.3× faster charge than the existing method (without controller) while increasing energy density by 14% compared to FC. Controller 801 of various embodiments optimizes the sequence and charging rate for a hybrid battery so that charging current can be maximized Users of mobile computing devices (e.g., laptops) typically desire fast charging when battery is running out, and the scheme of various embodiments is beneficial to such users than the existing scheme of FIG. 7.

While the embodiments here are described with reference to same charge capacities for FC battery 701 and HE battery 702, different capacity cells and/or different sized cells can also be used. In some examples, different number of FC battery 701 and HE battery 702 may be used. In some embodiments, step charging which starts with even higher current for a certain time period, than conventional charging method, may be used. In various embodiments, controller 801 is shown as part of the hybrid battery system 800. However, controller 801 can be a remote controller away from hybrid battery system 800 but communicatively coupled (wirelessly or by wired means) to hybrid battery system 800.

Here, the battery charging method managed by controller 801 may be constant current (CC) followed by constant voltage (CV). As described with reference to FIG. 5, charging may start with CC for FC battery 701 first. When CV charging starts for FC battery 701, remaining power budget for charging may be allocated for charging HE battery 702 (e.g. CC for HE battery 702), in accordance with some embodiments.

In some embodiments, when FC battery 701 is under CV charging, controller 801 may switch to CC charging for HE battery 702 when current in CV charging for FC battery 701 is lower than CC charging for HE battery 702. As such, controller 801 optimizes sequence of CC charging and CV charging for FC battery 701 and HE battery 702 so that charging current can be maximized In some embodiments, during discharge, controller 801 may discharge FC battery 701 first to make next charge faster. When higher discharge power is needed (e.g. in turbo mode), controller 801 may use both FC battery 701 and HE battery 702. In some embodiments, if hybrid system 700 uses power from both FC battery 701 and HE battery 702 during discharge but voltage level (e.g., state of charge) of FC battery 701 and HE battery 702 are different, controller 801 may regulate discharge current of FC battery 701 and HE battery 702 so that voltages of FC battery 701 and HE battery 702 are similar. The scheme performed by controller 801 may reside in firmware in the battery pack, charger integrated circuit (IC), charger and/or in a memory space of a microcontroller unit, in accordance with some embodiments.

In some embodiments, when a charger capability is below the battery charging specification, controller 801 optimizes current and sequence of CC charging and CV charging for FC battery 701 and HE battery 702 so that charging current can be maximized within the limit of the charger. While various embodiments describe the hybrid battery pack in a multi-system battery, the schemes of various embodiments are applicable to batteries in datacenter, electric vehicle, drone, smart devices, Internet of Things, etc.

In some embodiments, controller 801 or any other suitable logic may consider context awareness and machine-learning to adapt to user habits and environmental situations to regulate charging speed intentionally to mitigate battery degradation (over time). For example, if a user is charging hybrid battery system 800 overnight and has enough time for full charge even if charging speed is slower, the logic may reduce charging current of FC battery 701 and/or HE battery 702. In another example, an algorithm could recognize that an early air flight may disrupt the typical schedule and may prioritize charging time to accommodate the reduced evening cycle.

Figure 9:
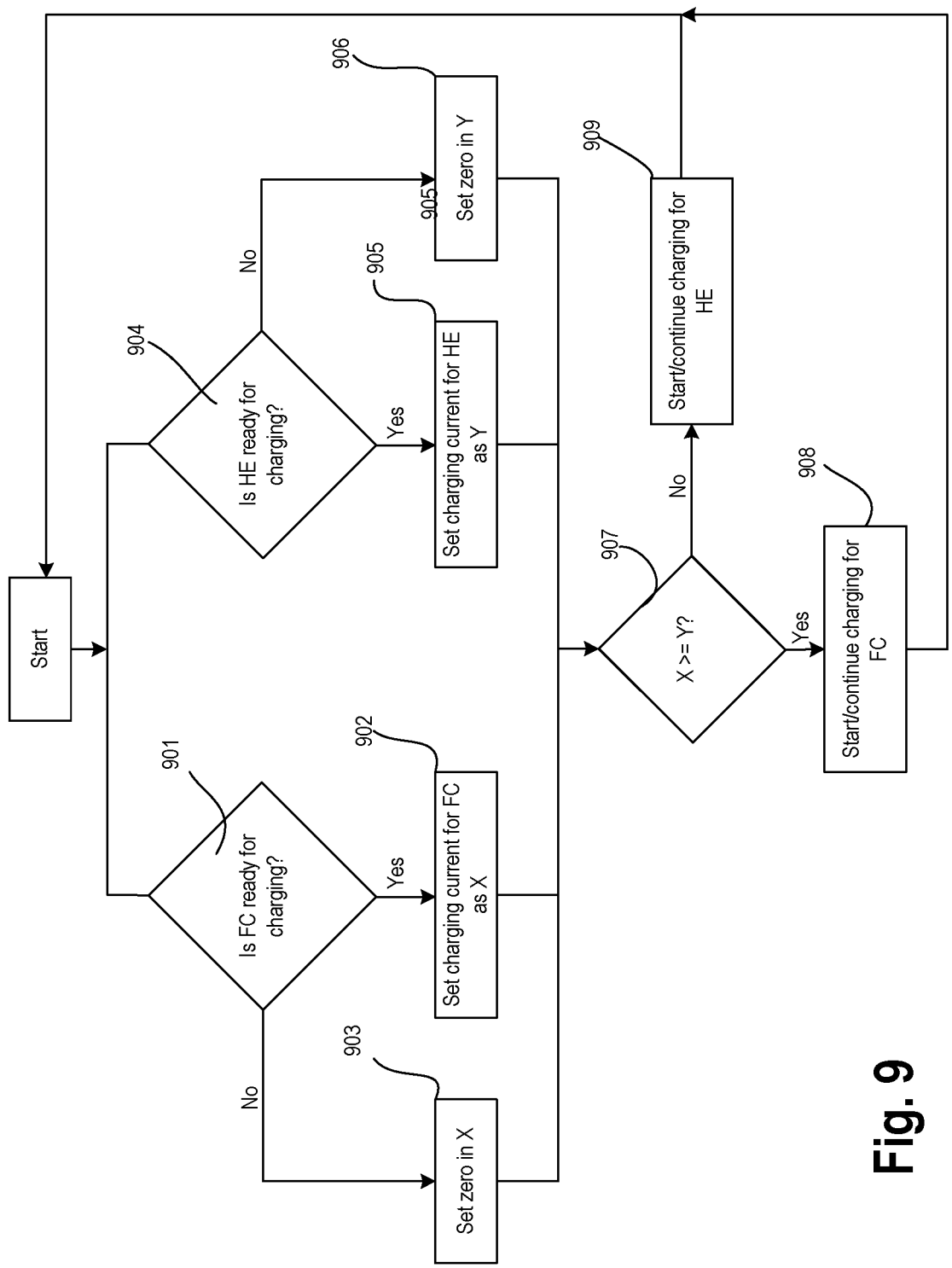
FIG. 9 illustrates a flowchart of optimizing charging and/or discharging behavior of a hybrid battery comprising FC and HE batteries.

FIG. 9 illustrates flowchart 900 of optimizing charging and/or discharging behavior of a hybrid battery comprising FC and HE batteries. While the blocks of flowchart 900 are illustrated in a particular order, the order can be modified. For example, some blocks may be performed before others while some blocks may be performed in parallel. In some embodiments, some or all blocks of flowchart 900 are implemented in hardware, software, or a combination of them.

Upon starting the charging process of hybrid battery system 800, controller 801 determines at block 901 whether FC battery 701 is ready for charging. In some embodiments, controller 801 simultaneously (or out-of-order) determines at block 902 whether HE battery 702 is ready for charging. Criteria for a battery being ready for charging is whether the charge of the battery is below a limit threshold charge (e.g., 95%) set by a user or manufacturer. The limit threshold charge can be predetermined or programmable by software or hardware (e.g., registers and/or fuses). If FC battery 701 is ready for charging, the process proceeds to block 902. At block 902, controller 801 sets the charging current for FC battery 701 as 'X'. Conversely, if controller 801 determines that FC battery 701 is not ready for charging (e.g., because the battery is fully charged or at its maximum limit threshold charge), the process proceeds to block 903. At block 903, controller 801 sets the charging current 'X' as zero.

Referring back to block 904. If HE battery 702 is ready for charging, the process proceeds to block 905. At block 905, controller 801 sets the charging current for HE battery 702 as 'Y'. Conversely, if controller 801 determines that HE battery 702 is not ready for charging (e.g., because the battery is fully charged or at its maximum limit threshold charge), the process proceeds to block 906. At block 903, controller 801 sets the charging current 'Y' as zero.

At block 907, controller 801 compares the charging currents 'X' and 'Y'. If the charging current 'X' is greater or equal to charging current 'Y', the process proceeds to block 908 where controller starts or continues charging FC battery 701. If the charging current 'X' is less that the charging current 'Y', the process proceeds to block 909 where controller 801 starts or continues charging HE battery 702. This process is repeated till FC and/or HE batteries are charged up to maximum (or maximum limit threshold).

As discussed with reference to FIG. 5, a typical battery charging method is Constant Current (CC) followed by Constant Voltage (CV). In some embodiments, when CC for FC battery 701 is completed and FC battery 701 is being charged with CV, controller 801 may stop CV charging for FC 701 and start CC charging or HE battery 702 when current during CV charging for FC battery 701 is lower than current in CC charging for HE battery 702. Even during CV charging, reduced charging current goes to battery as shown by FIG. 5. The blocks in 900 (e.g. 902/905/908/909) are applicable regardless of CC or CV.

Figure 10:
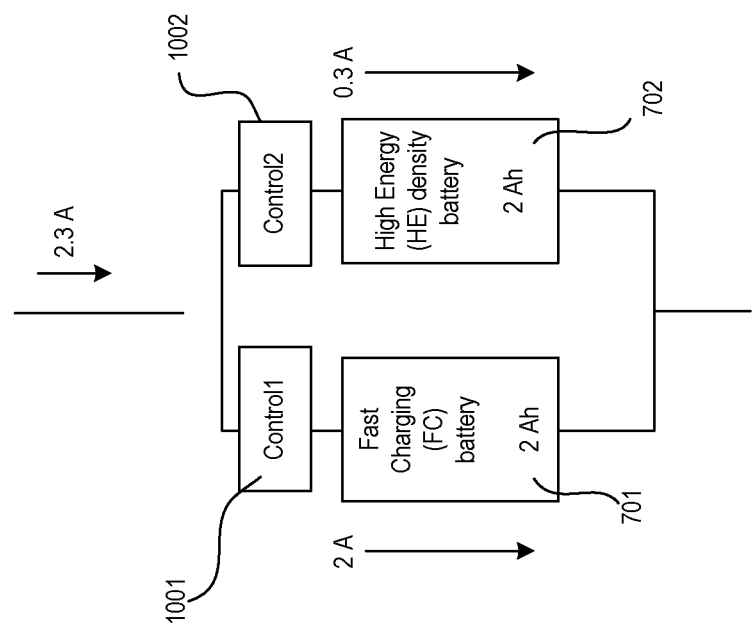
FIG. 10 illustrates a hybrid battery system where FC battery is coupled in parallel to an HE battery, where the two batteries are controlled by separate controllers to optimize charging and/or discharging behavior of the batteries, in accordance with some embodiments.

FIG. 10 illustrates hybrid battery system 1000 where FC battery is coupled in parallel to an HE battery, where the two batteries are controlled by separate controllers to optimize charging and/or discharging behavior of the batteries, in accordance with some embodiments. In some embodiments, each battery in system 1000 is controlled by its respective controller. For example, FC battery 701 is controlled by controller 1001, while HE battery 702 is controlled by controller 1002. As such, the dedicated controllers of each battery regulate charging current for that battery according to the battery cell specification of that battery. In some embodiments, a supervisor charge controller (not shown) can be used that controls each controller 801 and 802 (herein supervisee controllers) to get the maximum charge current for FC battery 701 and HE battery 702 at the same time reducing overall charge time for both.

Continuing with the example specification listed in Table 1, maximum charging current can be applied to both battery cells (FC battery 701 and HE battery 702) at the same time by having a dedicated charging controller for each cell. In this example, the total charging current is 2.3 A which is higher than the existing hybrid battery (0.6 A) of FIG. 7 while increasing energy density by 14% of system 1000 compared to FC alone.

Figure 11B:
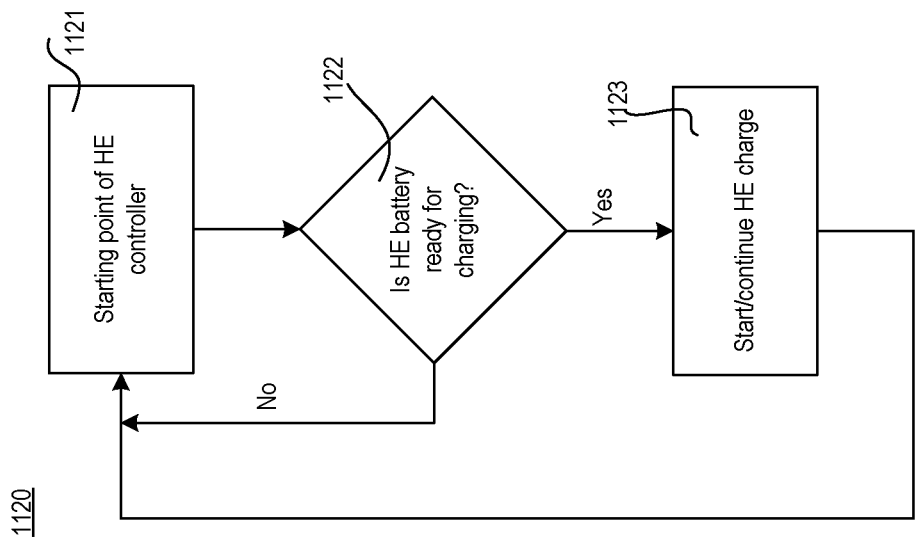
FIGS. 11A-B illustrate a flowchart for optimizing charging and/or discharging behavior of FC battery, and a flowchart for optimizing charging and/or discharging behavior of HE battery, respectively, in accordance with some embodiments.
Figure 11A:
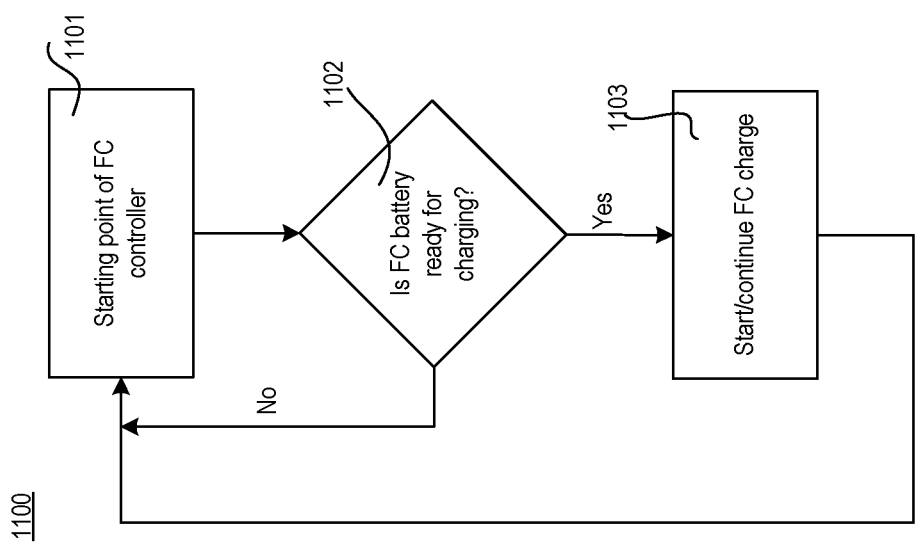

FIGS. 11A-B illustrate flowchart 1100 for optimizing charging and/or discharging behavior of FC battery, and flowchart 1120 for optimizing charging and/or discharging behavior of HE battery, respectively, in accordance with some embodiments. While the blocks of flowcharts 1100 and 1120 are illustrated in a particular order, the order can be modified. For example, some blocks may be performed before others while some blocks may be performed in parallel. In some embodiments, some or all blocks of flowcharts 1100 and/or 1120 are implemented in hardware, software, or a combination of them.

At block 1101, controller 1001 determines the charge level of FC battery 701 and, hence the charging starting point for FC battery 701. At block 1102, controller 1001 determines whether FC battery 701 is ready for charging. Criteria for a battery being ready for charging is whether the charge of the battery is below a limit threshold charge (e.g., 95%) set by a user or manufacturer. The limit threshold charge can be predetermined or programmable by software or hardware (e.g., registers and/or fuses). If controller 1001 determines that FC battery 701 is ready for charging, the process proceeds to block 1103 where FC battery 701 is charged according to its fast charging mechanism. The process then proceeds to block 1101. If controller 1001 determines that FC battery 701 is not ready for charging (e.g., because it is fully charged) the process proceeds to block 1101. The same process applies for charging HE battery 702.

At block 1121, controller 1002 determines the charge level of HE battery 702 and, hence the charging starting point for HE battery 702. At block 1122, controller 1002 determines whether HE battery 702 is ready for charging. Criteria for a battery being ready for charging is whether the charge of the batter is below a limit threshold charge (e.g., 95%) set by a user or manufacturer. The limit threshold charge can be predetermined or programmable by software or hardware (e.g., registers and/or fuses). If controller 1002 determines that HE battery 702 is ready for charging, the process proceeds to block 1123 where HE battery 702 is charged according to its charging mechanism. The process then proceeds to block 1121. If controller 1002 determines that HE battery 702 is not ready for charging (e.g., because it is fully charged), the process proceeds to block 1121. The same process applies for charging HE battery 701.

Elements of embodiments (e.g., flowcharts with reference various embodiments) are also provided as a machine-readable medium (e.g., memory) for storing the computer-executable instructions (e.g., instructions to implement any other processes discussed herein). In some embodiments, computing platform comprises memory, processor, machine-readable storage media (also referred to as tangible machine-readable medium), communication interface (e.g., wireless or wired interface), and network bus coupled together.

In some embodiments, processor is a Digital Signal Processor (DSP), an Application Specific Integrated Circuit (ASIC), a general-purpose Central Processing Unit (CPU), or a low power logic implementing a simple finite state machine to perform the method with reference to various flowcharts and/or various embodiments, etc.

In some embodiments, the various logic blocks of system are coupled together via a Network Bus. Any suitable protocol may be used to implement the network bus. In some embodiments, machine-readable storage medium includes Instructions (also referred to as the program software code/instructions) for calculating or measuring distance and relative orientation of a device with reference to another device as described with reference to various embodiments and flowchart.

Program software code/instructions associated with flowcharts with reference to various flowcharts and/or various embodiments and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts with reference to various flowcharts and/or various embodiments are executed by system.

In some embodiments, the program software code/instructions associated with reference to various flowcharts and/or various embodiments are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with reference to various flowcharts and/or various embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 12:
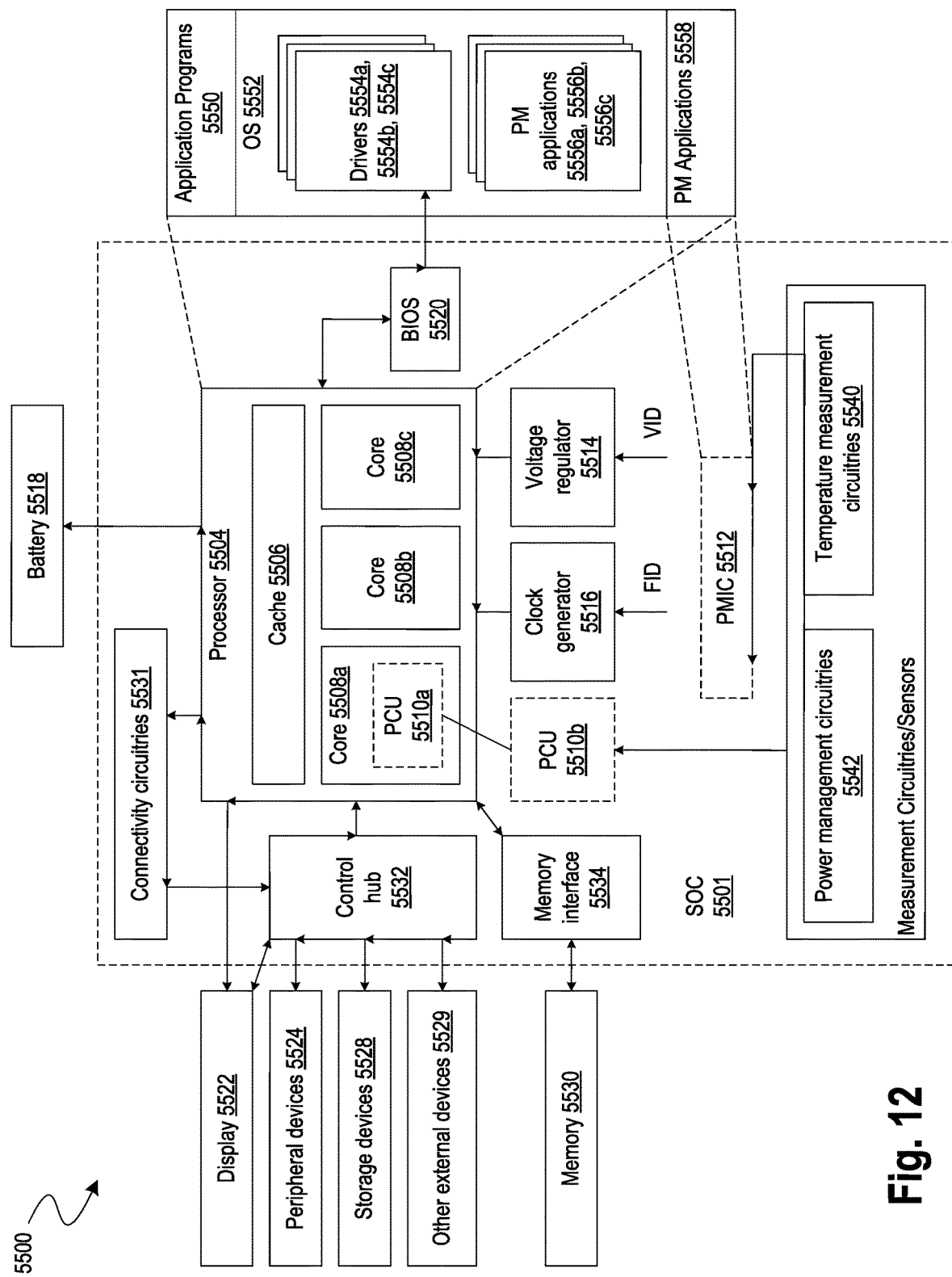
FIG. 12 illustrates a smart device or a computer system or a SoC (System-on-Chip) with workload dependent load-sharing mechanism for multiple batteries and/or hybrid energy sources, in accordance with some embodiments.

FIG. 12 illustrates a smart device or a computer system or a SoC (System-on-Chip) with workload dependent load-sharing mechanism for multiple batteries and/or hybrid energy sources, in accordance with some embodiments. It is pointed out that those elements of FIG. 12 having the same reference numbers (or names) as the elements of any other figure may operate or function in any manner similar to that described, but are not limited to such. Any block in this smart device can have the apparatus for dynamically optimizing battery charging voltage.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 12, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508*a*, 5508*b*, 5508*c*. Although merely three cores 5508*a*, 5508*b*, 5508*c* are illustrated in FIG. 12, processor 5504 may include any other appropriate number of processing cores, e.g., tens, or even hundreds of processing cores. Processor cores 5508*a*, 5508*b*, 5508*c* may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508*a*, a second section of cache 5506 dedicated to core 5508*b*, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a motherboard of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes—energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510a. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporarily increase the power draw for that core or processor 5504 (e.g., by increasing clock frequency and/or power supply voltage level) so that the core or processor 5504 can perform at higher performance level. As such, voltage and/or frequency can be increased temporarily for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556*a*, 5556*b*, 5556*c*. The OS 5552 may also include various drivers 5554*a*, 5554*b*, 5554*c*, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-Ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510*b*.

In some embodiments, pCode executing on PCU 5510*a/b* has a capability to enable extra compute and telemetries resources for the runtime support of the pCode. Here pCode refers to a firmware executed by PCU 5510*a/b* to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554a, 5554b, 5554c). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor may also be a dielet or chiplet.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here, the term "interconnect" refers to a communication link, or channel, between two or more points or nodes. It may comprise one or more separate conduction paths such as wires, vias, waveguides, passive components, and/or active components. It may also comprise a fabric. In some embodiments, a p-unit is coupled to an OS via an interface.

Here the term "interface" generally refers to software and/or hardware used to communicate with an interconnect. An interface may include logic and I/O driver/receiver to send and receive data over the interconnect or one or more wires.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a first battery coupled to a first load via a first power supply rail, the first load including a processor; a second battery coupled to a second load via a second power supply rail; a plurality of switches coupled to the first load the second load; and logic to determine whether a state of charge of the first battery is approximately equal to a state of charge of the second battery, and in response to such determination the logic is to turn on the plurality of switches if a demand by the processor is bursty.

Example 2: The apparatus of claim 1 comprises: a first charger; and a first battery transistor controllable by the first charger, wherein the first battery transistor is coupled to the first power supply rail, wherein the logic is to turn on the first battery transistor when the demand is bursty.

Example 3: The apparatus of claim 2 comprises: a second charger; and a second battery transistor controllable by the second charger, wherein the second battery transistor is coupled to the second power supply rail, wherein the logic is to turn on the second battery transistor when the demand is bursty.

Example 4: The apparatus of claim 3, wherein if the logic determines that the state of charge of the first battery is approximately equal to a state of charge of the second battery and the demand is not bursty, the logic is to cause the apparatus to enter an energy saving mode where the plurality of switches is turned off and the first battery transistor and the second battery transistor are fully turned on.

Example 5: The apparatus of claim 3, wherein if the logic determines that the state of charge of the first battery is not approximately equal to a state of charge of the second battery and the demand is not bursty, the logic is to cause the apparatus to enter a balancer mode where the plurality of switches is turned on and impedances of the first battery transistor and the second battery transistor are controlled by the first charger and the second charger, respectively.

Example 6: The apparatus of claim 3, wherein if the logic determines that the state of charge of the first battery is not approximately equal to a state of charge of the second battery by a threshold, and the demand is not bursty, the logic is to cause the plurality of switches to be turned on and the first battery transistor and the second battery transistor to be turned off.

Example 7: The apparatus of claim 3, wherein if logic determines that a power adaptor is connected to the apparatus, the logic is to turn off the plurality of switches and turn on the first battery transistor and the second battery transistor.

Example 8: The apparatus of claim 1, wherein the first battery and/or the second battery is a hybrid battery comprising a high energy density battery coupled to a fast charging battery.

Example 9: An apparatus comprising: a first battery coupled to a first load via a first power supply rail, the first load including a processor; a second battery coupled to a second load via a second power supply rail; a plurality of switches coupled to the first load the second load; and logic is to turn on the plurality of switches to couple the first and second power supply rails when the processor enters a high-performance mode, wherein the logic is to turn off the plurality of switches when the processor enters a normal mode of operation.

Example 10: The apparatus of claim 9 comprises: a first charger; a first battery transistor controllable by the first charger, wherein the first battery transistor is coupled to the first power supply rail; a second charger; and a second battery transistor controllable by the second charger, wherein the second battery transistor is coupled to the second power supply rail.

Example 11: The apparatus of claim 10, wherein the logic is to turn off the plurality of switches if the processor is in the normal mode and state of charge of the first battery is approximately equal to a state of charge of the second battery, and wherein the first charger is to control an impedance of the first battery transistor, and the second charger is to control an impedance of the second battery transistor.

Example 12: A system comprising: a first housing having a first battery, a first display, a processor, an embedded controller, a plurality of switches controllable by a balancer coupled to the embedded controller, wherein the first battery is coupled to the first display and the processor via a first power supply rail; a first housing having a second battery and a second display, wherein the second battery is coupled to the second display via a second power supply rail; and a hinge coupled to the first and second housing via the plurality of switches, wherein the embedded controller and/or the balancer is to determine whether a state of charge of the first battery is approximately equal to a state of charge of the second battery, and in response to such determination the embedded controller and/or the balancer is to turn on the plurality of switches if a demand by the processor is bursty.

Example 13: The system of claim 12, wherein the first housing comprises: a first charger; and a first battery transistor controllable by the first charger, wherein the first battery transistor is coupled to the first power supply rail, wherein the embedded controller and/or the balancer is to turn on the first battery transistor when the demand is bursty.

Example 14: The system of claim 13, wherein the second housing comprises: a second charger; and a second battery transistor controllable by the second charger, wherein the second battery transistor is coupled to the second power supply rail, wherein the embedded controller and/or the balancer is to turn on the second battery transistor when the demand is bursty.

Example 15: The system of claim 14, wherein if the embedded controller and/or the balancer determines that the state of charge of the first battery is approximately equal to a state of charge of the second battery and the demand is not bursty, the embedded controller and/or the balancer is to cause the system to enter an energy saving mode where the plurality of switches is turned off and the first battery transistor and the second battery transistor are fully turned on.

Example 16: The system of claim 14, wherein if the embedded controller and/or the balancer determines that the state of charge of the first battery is not approximately equal to a state of charge of the second battery and the demand is not bursty, the embedded controller and/or the balancer is to cause the system to enter a balancer mode where the plurality of switches is turned on and impedances of the first battery transistor and the second battery transistor are controlled by the first charger and the second charger, respectively.

Example 17: The system of claim 14, wherein if the embedded controller and/or the balancer determines that the state of charge of the first battery is not approximately equal to a state of charge of the second battery by a threshold, and the demand is not bursty, the embedded controller and/or the balancer is to cause the plurality of switches to be turned on and the first battery transistor and the second battery transistor are to be turned off.

Example 18: The system of claim 14, wherein if embedded controller and/or the balancer determines that a power adaptor is connected to the system, the embedded controller and/or the balancer is to turn off the plurality of switches and turn on the first battery transistor and the second battery transistor.

Example 19: The system of claim 14, wherein the first battery and/or the second battery is a hybrid battery comprising a high energy density battery coupled to a fast charging battery.

Example 20: The system of claim 19, wherein the hybrid battery is controlled by a controller, wherein the controller is to charge the fast charging battery with constant current and thereafter with constant voltage, and wherein the controller is to charge the high energy density battery with constant current when the fast charging battery is being charged with constant voltage.

Example 21: An apparatus comprising: a first battery capable of fast charging; a second battery with high energy density; a controller coupled to the first and second batteries, wherein the controller is to control a sequence of charging and/or discharging the first and second batteries to maximize a charging current and charging speed for the first and second batteries.

Example 22: The apparatus of claim 21, wherein the controller is to charge the first battery with constant current and thereafter with constant voltage, and wherein the controller is to charge the second battery with constant current when the first battery is being charged with constant voltage.

Example 23: The apparatus of claim 21, wherein the controller is to charge the first battery with constant current and thereafter with constant voltage, and wherein the controller is to charge the second battery with constant current when a current during constant voltage charging of the first battery is less than a constant current for the second battery.

Example 24: The apparatus of claim 21, wherein the controller is to discharge the first battery first and then the second battery.

Example 25: The apparatus of claim 21, wherein the controller is to discharge both the first battery first and the second battery when a load coupled to the first and second batteries is turbo mode.

Example 26: The apparatus of claim 21, wherein when a load coupled to the first and second batteries uses power from both the first and second batteries, but a state of charge of the first battery is different than a state of charge of the second battery, then the controller discharges the first and second batteries such that voltages of the first and second batteries are substantially similar.

Example 27: The apparatus of claim 21, wherein the controller is implemented in software, hardware, or a combination of software and hardware.

Example 28: The apparatus of claim 21, wherein the controller is to apply context awareness and/or machine-learning to adapt to user habits and/or environmental situations to regulate charging of the first and second batteries.

Example 29: An apparatus comprising: a first battery capable of fast charging; a second battery with high energy density, wherein the second battery is coupled to the first battery; a first controller coupled to the first battery; a second controller coupled to the second battery, wherein the second controller is coupled to the first controller, wherein the first controller is to control a sequence of charging and/or discharging of the first battery to maximize a charging current and charging speed for the first battery, and wherein the second controller is to control a sequence of charging and/or discharging of the second battery to maximize a charging current and charging speed for the second battery.

Example 30: The apparatus of claim 29, wherein the first controller is to charge the first battery with constant current and thereafter with constant voltage, and wherein the second controller is to charge the second battery with constant current when the first battery is being charged with constant voltage.

Example 31: The apparatus of claim 29, wherein the first controller is to charge the fast battery with constant current and thereafter with constant voltage, and wherein the second controller is to charge the second battery with constant current when a current during constant voltage charging of the first battery is less than a constant current for the second battery.

Example 32: The apparatus of claim 29, wherein the first controller is to discharge the first battery first, and wherein the second controller is to then discharge the second battery.

Example 33: The apparatus of claim 29, wherein when a load coupled to the first and second batteries uses power from both the first and second batteries, but a state of charge of the first battery is different than a state of charge of the second battery, then the first and second controllers discharge the first and second batteries, respectively, such that voltages of the first and second batteries are substantially similar.

Example 34: The apparatus of claim 29, wherein the first and/or second controllers is implemented in software, hardware, or a combination of software and hardware.

Example 35: The apparatus of claim 29, wherein the first and second controllers are to apply context awareness and/or machine-learning to adapt to user habits and/or environmental situations to regulate charging of the first and second batteries.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a first battery coupled to a first load via a first power supply rail, the first load including a processor;
   a second battery coupled to a second load via a second power supply rail;
   a plurality of switches coupled to the first load and the second load;
   logic to determine whether a state of charge of the first battery is approximately equal to a state of charge of the second battery, and in response to such determination the logic is to turn on the plurality of switches to couple the second battery to the first load if a demand by the processor is bursty; and
   a first charger; and a first battery transistor controllable by the first charger, wherein the first battery transistor is coupled to the first power supply rail, wherein the logic is to turn on the first battery transistor when the demand is bursty; and
   a second charger and a second battery transistor controllable by the second charger, wherein the second battery transistor is coupled to the second power supply rail, wherein the logic is to turn on the second battery transistor when the demand is bursty.

2. The apparatus of claim 1, wherein if the logic determines that the state of charge of the first battery is approximately equal to a state of charge of the second battery and the demand is not bursty, the logic is to cause the apparatus to enter an energy saving mode where the plurality of switches is turned off and the first battery transistor and the second battery transistor are fully turned on.

3. The apparatus of claim 1, wherein if the logic determines that the state of charge of the first battery is not approximately equal to a state of charge of the second battery and the demand is not bursty, the logic is to cause the apparatus to enter a balancer mode where the plurality of switches is turned on and impedances of the first battery transistor and the second battery transistor are controlled by the first charger and the second charger, respectively.

4. The apparatus of claim 1, wherein if the logic determines that the state of charge of the first battery is not approximately equal to a state of charge of the second battery by a threshold, and the demand is not bursty, the logic is to cause the plurality of switches to be turned on and the first battery transistor and the second battery transistor to be turned off.

5. The apparatus of claim 1, wherein if logic determines that a power adaptor is connected to the apparatus, the logic is to turn off the plurality of switches and turn on the first battery transistor and the second battery transistor.

6. The apparatus of claim 1, wherein the first battery and/or the second battery is a hybrid battery comprising a high energy density battery coupled to a fast charging battery.

7. An apparatus comprising:
a first battery coupled to a first load via a first power supply rail, the first load including a processor;
a second battery coupled to a second load via a second power supply rail;
a plurality of switches coupled to the first load and the second load; and
logic to turn on the plurality of switches to couple the first and second power supply rails to one another when the processor enters a high-performance mode, wherein the logic is to turn off the plurality of switches when the processor enters a normal mode of operation.

8. The apparatus of claim 7 comprises:
a first charger;
a first battery transistor controllable by the first charger, wherein the first battery transistor is coupled to the first power supply rail;
a second charger; and
a second battery transistor controllable by the second charger, wherein the second battery transistor is coupled to the second power supply rail.

9. The apparatus of claim 8, wherein the logic is to turn off the plurality of switches if the processor is in the normal mode and state of charge of the first battery is approximately equal to a state of charge of the second battery, and wherein the first charger is to control an impedance of the first battery transistor, and the second charger is to control an impedance of the second battery transistor.

10. A system comprising:
a first housing having a first battery, a first display, a processor, an embedded controller, a plurality of switches controllable by a balancer coupled to the embedded controller, wherein the first battery is coupled to the first display and the processor via a first power supply rail;
a second housing having a second battery and a second display, wherein the second battery is coupled to the second display via a second power supply rail; and
a hinge coupled to the first and second housing via the plurality of switches, wherein the embedded controller and/or the balancer is to determine whether a state of charge of the first battery is approximately equal to a state of charge of the second battery, and in response to such determination the embedded controller and/or the balancer is to turn on the plurality of switches if a demand by the processor is bursty.

11. The system of claim 10, wherein the first housing comprises:
a first charger; and
a first battery transistor controllable by the first charger, wherein the first battery transistor is coupled to the first power supply rail, wherein the embedded controller and/or the balancer is to turn on the first battery transistor when the demand is bursty.

12. The system of claim 11, wherein the second housing comprises:
a second charger; and
a second battery transistor controllable by the second charger, wherein the second battery transistor is coupled to the second power supply rail, wherein the embedded controller and/or the balancer is to turn on the second battery transistor when the demand is bursty.

13. The system of claim 12, wherein if the embedded controller and/or the balancer determines that the state of charge of the first battery is approximately equal to a state of charge of the second battery and the demand is not bursty, the embedded controller and/or the balancer is to cause the system to enter an energy saving mode where the plurality of switches is turned off and the first battery transistor and the second battery transistor are fully turned on.

14. The system of claim 12, wherein if the embedded controller and/or the balancer determines that the state of charge of the first battery is not approximately equal to a state of charge of the second battery and the demand is not bursty, the embedded controller and/or the balancer is to cause the system to enter a balancer mode where the plurality of switches is turned on and impedances of the first battery transistor and the second battery transistor are controlled by the first charger and the second charger, respectively.

15. The system of claim 12, wherein if the embedded controller and/or the balancer determines that the state of charge of the first battery is not approximately equal to a state of charge of the second battery by a threshold, and the demand is not bursty, the embedded controller and/or the balancer is to cause the plurality of switches to be turned on and the first battery transistor and the second battery transistor are to be turned off.

16. The system of claim 12, wherein the first battery and/or the second battery is a hybrid battery comprising a high energy density battery coupled to a fast charging battery.

17. The system of claim 12, wherein if embedded controller and/or the balancer determines that a power adaptor is connected to the system, the embedded controller and/or the balancer is to turn off the plurality of switches and turn on the first battery transistor and the second battery transistor.

18. The system of claim 16, wherein the hybrid battery is controlled by a controller, wherein the controller is to charge the fast charging battery with constant current and thereafter with constant voltage, and wherein the controller is to charge the high energy density battery with constant current when the fast charging battery is being charged with constant voltage.

* * * * *